United States Patent
Cho et al.

(10) Patent No.: US 8,391,697 B2
(45) Date of Patent: Mar. 5, 2013

(54) MOBILE TERMINAL AND METHOD OF CONTROLLING THE OPERATION OF THE MOBILE TERMINAL

(75) Inventors: Hye Youn Cho, Seoul (KR); Yea Eun Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 163 days.

(21) Appl. No.: 12/749,414

(22) Filed: Mar. 29, 2010

(65) Prior Publication Data

US 2011/0076003 A1    Mar. 31, 2011

(30) Foreign Application Priority Data

Sep. 30, 2009    (KR) .......................... 10-2009-0093338

(51) Int. Cl.
*G03B 17/00* (2006.01)
*H04N 5/228* (2006.01)
(52) U.S. Cl. ..................................... 396/50; 348/208.16
(58) Field of Classification Search .................... 396/50, 396/52, 322, 325, 334, 297; 348/208.12, 348/373–376, 208.16
See application file for complete search history.

(56) References Cited

U.S. PATENT DOCUMENTS

| | | | |
|---|---|---|---|
| 7,174,195 B2 * | 2/2007 | Nagamine | 455/575.1 |
| 2006/0204232 A1 * | 9/2006 | Weinberg et al. | 396/50 |
| 2007/0115382 A1 * | 5/2007 | Fukuma et al. | 348/333.06 |
| 2008/0259094 A1 * | 10/2008 | Kim et al. | 345/651 |
| 2008/0273116 A1 * | 11/2008 | Gentric | 348/515 |
| 2009/0115881 A1 * | 5/2009 | Joo et al. | 348/333.06 |

\* cited by examiner

*Primary Examiner* — W. B. Perkey
*Assistant Examiner* — Minh Phan
(74) *Attorney, Agent, or Firm* — Lee, Hong, Degerman, Kang & Waimey

(57) ABSTRACT

A mobile terminal and a method of controlling the operation of the mobile terminal are provided. The method includes operating a camera provided in a main body of the mobile terminal in a first camera mode, and displaying a screen corresponding to an operation selected during the first camera mode on a display module; and if a 360-degree rotation of the main body about a predetermined axial direction is detected, operating the camera in a second camera mode and displaying a screen corresponding to an operation selected during the second camera mode on the display module. Therefore, it is possible to easily switch the mobile terminal from one camera mode to another camera mode in accordance with the movement of the main body of the mobile terminal.

5 Claims, 14 Drawing Sheets

MOBILE TERMINAL AND METHOD OF CONTROLLING THE OPERATION OF THE MOBILE TERMINAL

CROSS-REFERENCE TO RELATED APPLICATION

This application claims the priority benefit of Korean Patent Application No. 10-2009-0093338, filed on Sep. 30, 2009 in the Korean Intellectual Property Office, the disclosure of which is incorporated herein by reference.

BACKGROUND OF THE INVENTION

1. Field of the Invention

The present invention relates to a mobile terminal and a method of controlling the operation of the mobile terminal, in which various operations performed by a camera of the mobile terminal can be effectively controlled in accordance with the movement of the main body of the mobile terminal.

2. Description of the Related Art

Mobile terminals are portable devices, which can provide users with various services such as a voice calling service, a video calling service, an information input/output service, and a data storage service.

As the types of services provided by mobile terminals diversify, an increasing number of mobile terminals have been equipped with various complicated functions such as capturing photos or moving pictures, playing music files or moving image files, providing game programs, receiving broadcast programs and providing wireless internet services and have thus evolved into multimedia players.

Various attempts have been made to realize such complicated functions as hardware devices or software programs. For example, various user interface (UI) environments, in which users are allowed to easily search for and choose desired functions, have been developed. In addition, various equipment such as a double-sided liquid crystal display (LCD), a full touch screen or a high-resolution camera is being applied to mobile terminals.

In the meantime, as the functions of cameras of mobile terminals diversify, the setting of a camera mode and a menu system for selecting one of various functions of the cameras have become increasingly complicated. In addition, users are required to navigate through such a complicated menu system to switch their mobile terminals to the camera mode or switch their mobile terminals from one camera function to another camera function.

Therefore, it is necessary to develop ways to control the operation of a camera of a mobile terminal not only using an existing menu-based data input/output method but also using a new data input method and thus to efficiently use various functions provided by the camera.

SUMMARY OF THE INVENTION

The present invention provides a mobile terminal and a method of controlling the operation of the mobile terminal, in which the operation of a camera of the mobile terminal can be controlled in accordance with the movement of the main body of the mobile terminal or a simple manipulation of the mobile terminal.

According to an aspect of the present invention, there is provided a method of controlling the operation of a mobile terminal, the method including operating a camera provided in a main body of the mobile terminal in a first camera mode, and displaying a screen corresponding to an operation selected during the first camera mode on a display module; and if it is determined that the main body has been rotated once about a predetermined axial direction, operating the camera in a second camera mode and displaying a screen corresponding to an operation selected during the second camera mode on the display module.

According to another aspect of the present invention, there is provided a mobile terminal including a camera configured to be provided in a main body of the mobile terminal; a motion sensor configured to sense a movement of the main body; a display module configured to display a screen associated with the operation of the camera; and a controller configured to operate the camera in a first camera mode and display a screen corresponding to an operation selected during the first camera mode on the display module, wherein, if sensing data provided by the motion sensor indicates that the main body has been rotated once about a predetermined axial direction, the controller sets the camera in a second camera mode and displays a screen corresponding to an operation selected during the second camera mode on the display module.

According to another aspect of the present invention, there is provided a method of controlling the operation of a mobile terminal, the method including operating a first camera provided at the front of a main body of the mobile terminal in a first camera mode, and displaying a screen corresponding to an operation selected during the first camera mode on a display module; if it is determined that the main body has been rotated once about a predetermined axial direction, terminating the first camera mode; and operating a second camera provided at the rear of the main body in a second camera mode and displaying a screen corresponding to an operation selected during the second camera mode on the display module.

According to another aspect of the present invention, there is provided a mobile terminal including a first camera configured to be provided at the front of a main body of the mobile terminal; a second camera configured to be provided at the rear of the main body; a motion sensor configured to sense a movement of the main body; a display module configured to display a screen associated with the operation of the first or second camera; and a controller configured to operate the first camera in the first camera mode and display a screen corresponding to an operation selected during the first camera mode on the display module, wherein, if sensing data provided by the motion sensor indicates that the main body has been rotated once about a predetermined axial direction, the controller terminates the first camera mode, sets the second camera in a second camera mode and displays a screen corresponding to an operation selected during the second camera mode on the display module.

According to another aspect of the present invention, there is provided a method of controlling the operation of a mobile terminal, the method including operating a camera provided in a main body of the mobile terminal in a first camera mode, and displaying a screen corresponding to an operation selected during the first camera mode on a display module; and if an amount of light incident upon the lens of the camera is less than a reference level, switching the camera to a second camera mode and displaying a screen corresponding to an operation selected during the second camera mode on the display module.

According to another aspect of the present invention, there is provided a mobile terminal including a camera configured to be provided in a main body of the mobile terminal; a photosensitive sensor configured to determine an amount of light incident upon the lens of the camera; a display module configured to display a screen associated with the operation of the camera; and a controller configured to operate a camera provided in the main in a first camera mode and display a screen corresponding to an operation selected during the first camera mode on the display module, wherein, if sensing data provided by the photosensitive sensor indicates that an amount of light incident upon the lens of the camera is less than a reference level, the controller switches the camera to a second camera mode and displays a screen corresponding to an operation selected during the second camera mode on the display module.

According to another aspect of the present invention, there is provided a method of controlling the operation of a mobile terminal, the method including operating a first camera provided at the front of a main body of the mobile terminal in a first camera mode, and displaying a screen corresponding to an operation selected during the first camera mode on a display module; and if an amount of light incident upon the lens of the camera is less than a reference level, terminating the first camera mode, operating a second camera provided at the rear of the main body in a second camera mode, and displaying a screen corresponding to an operation selected during the second camera mode on the display module.

According to another aspect of the present invention, there is provided a mobile terminal including a first camera configured to be provided at the front of a main body of the mobile terminal; a second camera configured to be provided at the rear of the main body; a photosensitive sensor configured to determine an amount of light incident upon the lens of the camera; a display module configured to display a screen associated with the operation of the first or second camera; and a controller configured to operate the first camera in a first camera mode and display a screen corresponding to an operation selected during the first camera mode on the display module, wherein, if sensing data provided by the photosensitive sensor indicates that an amount of light incident upon the lens of the camera is less than a reference level, the controller terminates the first camera mode, operates the second camera in a second camera mode, and displays a screen corresponding to an operation selected during the second camera mode on the display module.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

The present invention will hereinafter be described in detail with reference to the accompanying drawings in which exemplary embodiments of the invention are shown.

The term 'mobile terminal', as used herein, may indicate a mobile phone, a smart phone, a laptop computer, a digital broadcast receiver, a personal digital assistant (PDA), a portable multimedia player (PMP), or a navigation device. In this disclosure, the terms 'module' and 'unit' can be used interchangeably.

Figure 1:
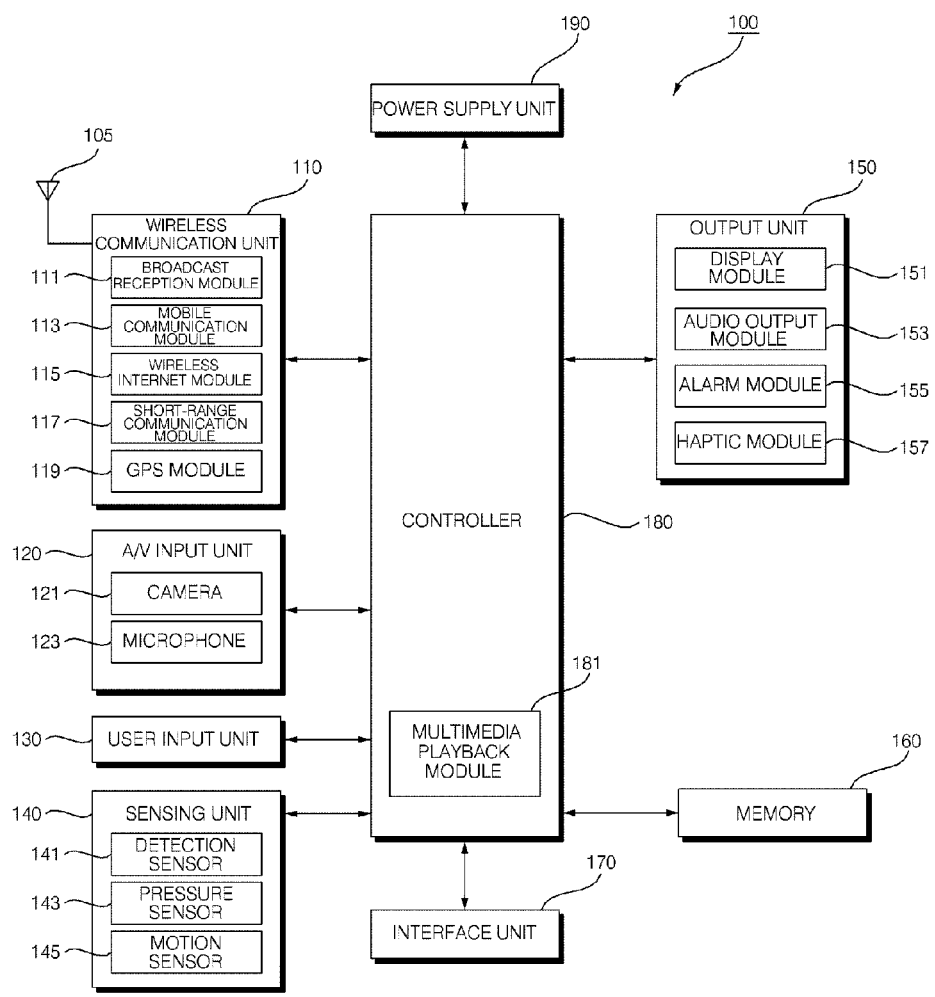
FIG. 1 illustrates a block diagram of a mobile terminal according to an exemplary embodiment of the present invention.

FIG. 1 illustrates a block diagram of a mobile terminal 100 according to an embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Two or more of the wireless communication unit 110, the A/V input unit 120, the user input unit 130, the sensing unit 140, the output unit 150, the memory 160, the interface unit 170, the controller 180, and the power supply unit 190 may be incorporated into a single unit, or some of the wireless communication unit 110, the A/V input unit 120, the user input unit 130, the sensing unit 140, the output unit 150, the memory 160, the interface unit 170, the controller 180, and the power supply unit 190 may be divided into two or more smaller units.

The wireless communication unit 110 may include a broadcast reception module 111, a mobile communication module 113, a wireless internet module 115, a short-range communication module 117, and a global positioning system (GPS) module 119.

The broadcast reception module 111 may receive at least one of a broadcast signal and broadcast-related information from an external broadcast management server through a broadcast channel. The broadcast channel may be a satellite channel or a terrestrial channel. The broadcast management server may be a server which generates broadcast signals and/or broadcast-related information and transmits the generated broadcast signals and/or the generated broadcast-related information or may be a server which receives and then transmits previously-generated broadcast signals and/or previously-generated broadcast-related information.

The broadcast-related information may include broadcast channel information, broadcast program information and/or broadcast service provider information. The broadcast signal may be a TV broadcast signal, a radio broadcast signal, a data broadcast signal, the combination of a data broadcast signal and a TV broadcast signal or the combination of a data broadcast signal and a radio broadcast signal. The broadcast-related information may be provided to the mobile terminal 100 through a mobile communication network. In this case, the broadcast-related information may be received by the mobile communication module 113, rather than by the broadcast reception module 111. The broadcast-related information may come in various forms.

The broadcast reception module 111 may receive the broadcast signal using various broadcasting systems. In addition, the broadcast reception module 111 may be configured to be suitable for nearly all types of broadcasting systems other than those set forth herein. The broadcast signal or the broadcast-related information received by the broadcast reception module 111 may be stored in the memory 160.

The mobile communication module 113 may transmit wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

The wireless internet module 115 may be a module for wirelessly accessing the internet. The wireless internet module 115 may be embedded in the mobile terminal 100 or may be installed in an external device. The wireless internet module 115 may be embedded in the mobile terminal 100 or may be installed in an external device. The wireless internet module 115 may use various wireless internet technologies such as wireless local area network (WLAN), Wireless Broadband (WiBro), World Interoperability for Microwave Access (Wimax), and High Speed Downlink Packet Access (HSDPA).

The short-range communication module 117 may be a module for short-range communication. The short-range communication module 117 may use various short-range communication techniques such as Bluetooth, radio frequency identification (RFID), infrared data association (IrDA), ultra wideband (UWB), and ZigBee.

The GPS module 119 may receive position information from a plurality of GPS satellites.

The A/V input unit 120 may be used to receive audio signals or video signals. The A/V input unit 120 may include a camera module 121 and a microphone 123. The camera module 121 may process various image frames such as still images or moving images captured by an image sensor during a video call mode or an image capturing mode. The image frames processed by the camera module 121 may be displayed by a display module 151.

The image frames processed by the camera module 121 may be stored in the memory 160 or may be transmitted to an external device through the wireless communication unit 110. The mobile terminal 100 may include two or more cameras 121.

The microphone 123 may receive external sound signals during a call mode, a recording mode, or a voice recognition mode with the use of a microphone and may convert the sound signals into electrical sound data. In the call mode, the mobile communication module 113 may convert the electrical sound data into data that can be readily transmitted to a mobile communication base station and then output the data obtained by the conversion. The microphone 123 may use various noise removal algorithms to remove noise that may be generated during the reception of external sound signals.

The user input unit 130 may receive a command or information by being pushed or touched by the user. The user input unit 130 may be implemented as a keypad, a dome switch, a static pressure or capacitive touch pad, a jog wheel, a jog switch, joystick, or a finger mouse. In particular, if the user input unit 130 is implemented as a touch pad and forms a layer structure together with the display module 151, the user input unit 130 and the display module 151 may be collectively referred to as a touch screen.

The sensing unit 140 determines a current state of the mobile terminal 100 such as whether the mobile terminal 100 is opened up or closed, the position of the mobile terminal 100 and whether the mobile terminal 100 is placed in contact with a user, and generates a sensing signal for controlling the operation of the mobile terminal 100. For example, when the mobile terminal 100 is a slider-type mobile phone, the sensing unit 140 may determine whether the mobile terminal 100 is opened up or closed. In addition, the sensing unit 140 may determine whether the mobile terminal 100 is powered by the power supply unit 190 and whether the interface unit 170 is connected to an external device.

The sensing unit 140 may include a detection sensor 141, a pressure sensor 143 and a motion sensor 145. The detection sensor 141 may determine whether there is an object nearby and approaching the mobile terminal 100 without any mechanical contact with the entity. More specifically, the detection sensor 141 may detect an object that is nearby and approaching by detecting a change in an alternating magnetic field or the rate of change of static capacitance. The sensing unit 140 may include two or more detection sensors 141.

The pressure sensor 143 may determine whether pressure is being applied to the mobile terminal 100 or may measure the level of pressure, if any, applied to the mobile terminal 100. The pressure sensor 143 may be installed in a certain part of the mobile terminal 100 where the detection of pressure is necessary. For example, the pressure sensor 143 may be installed in the display module 151. In this case, it is possible to differentiate a typical touch input from a pressure touch input, which is generated using a higher pressure level than that used to generate a typical touch input, based on data provided by the pressure sensor 143. In addition, when a pressure touch input is received through the display module 151, it is possible to determine the level of pressure applied to the display module 151 upon the detection of a pressure touch input based on data provided by the pressure sensor 143.

The motion sensor 145 may determine the location and motion of the mobile terminal 100 using an acceleration sensor or a gyro sensor.

In the meantime, acceleration sensors are a type of device for converting a vibration in acceleration into an electric signal. With recent developments in micro-electromechanical system (MEMS) technology, acceleration sensors have been widely used in various products for various purposes ranging from detecting large motions such as car collisions as performed in airbag systems for automobiles to detecting minute motions such as the motion of the hand as performed in gaming input devices. In general, one or more acceleration sensors representing two or three axial directions are incorporated into a single package. There are some cases when the detection of only one axial direction, for example, a Z-axis direction, is necessary. Thus, when an X- or Y-axis acceleration sensor, instead of a Z-axis acceleration sensor, is required, the X- or Y-axis acceleration sensor may be mounted on an additional substrate, and the additional substrate may be mounted on a main substrate.

Gyro sensors are sensors for measuring angular velocity, and may determine the relative direction of the rotation of the mobile terminal 100 to a reference direction.

The output unit 150 may output audio signals, video signals and alarm signals. The output unit 150 may include the display module 151, an audio output module 153, an alarm module 155, and a haptic module 157.

The display module 151 may display various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UI or a GUI for capturing or receiving images.

If the display module 151 and the user input unit 130 form a layer structure together and are thus implemented as a touch screen, the display module 151 may be used not only as an output device but also as an input device capable of receiving information in response to a touch input made by the user.

If the display module 151 is implemented as a touch screen, the display module 151 may also include a touch screen panel and a touch screen panel controller. The touch screen panel is a transparent panel attached onto the exterior of the mobile terminal 100 and may be connected to an internal bus of the mobile terminal 100. The touch screen panel keeps monitoring whether the touch screen panel is being touched by the user. Once a touch input to the touch screen panel is received, the touch screen panel transmits a number of signals corresponding to the touch input to the touch screen panel controller. The touch screen panel controller processes the signals transmitted by the touch screen panel, and transmits the processed signals to the controller 180. Then, the controller 180 determines whether a touch input has been generated and which part of the touch screen panel has been touched based on the processed signals transmitted by the touch screen panel controller.

The display module 151 may include electronic paper (e-paper). E-paper is a type of reflective display technology and can provide as high resolution as ordinary ink on paper, wide viewing angles, and excellent visual properties. E-paper can be implemented on various types of substrates such as a plastic, metallic or paper substrate and can display and maintain an image thereon even after power is cut off. In addition, e-paper can reduce the power consumption of the mobile terminal 100 because it does not require a backlight assembly. The display module 151 may be implemented as e-paper by using electrostatic-charged hemispherical twist balls, using electrophoretic deposition, or using microcapsules.

The display module 151 may include at least one of a liquid crystal display (LCD), a thin film transistor (TFT)-LCD, an organic light-emitting diode (OLED), a flexible display, and a three-dimensional (3D) display. The mobile terminal 100 may include two or more display modules 151. For example, the mobile terminal 100 may include an external display module (not shown) and an internal display module (not shown).

The audio output module 153 may output audio data received by the wireless communication unit 110 during a call reception mode, a call mode, a recording mode, a voice recognition mode, or a broadcast reception mode or may output audio data present in the memory 160. In addition, the audio output module 153 may output various sound signals associated with the functions of the mobile terminal 100 such as receiving a call or a message. The audio output module 153 may include a speaker and a buzzer.

The alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. More specifically, the alarm module 155 may output an alarm signal upon receiving a call signal or a message. In addition, the alarm module 155 may receive a key signal and may output an alarm signal as feedback to the key signal. Therefore, the user may be able to easily recognize the occurrence of an event based on an alarm signal output by the alarm module 155. An alarm signal for notifying the user of the occurrence of an event may be output not only by the alarm module 155 but also by the display module 151 or the audio output module 153.

The haptic module 157 may provide various haptic effects (such as vibration) that can be perceived by the user. If the haptic module 157 generates vibration as a haptic effect, the intensity and the pattern of vibration generated by the haptic module 157 may be altered in various manners. The haptic module 157 may synthesize different vibration effects and may output the result of the synthesization. Alternatively, the haptic module 157 may sequentially output different vibration effects.

The haptic module 157 may provide various haptic effects, other than vibration, such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by realizing the sense of heat or cold using a device capable of absorbing heat or generating heat. The haptic module 157 may be configured to enable the user to recognize a haptic effect using the kinesthetic sense of the fingers or the arms. The mobile terminal 100 may include two or more haptic modules 157.

The memory 160 may store various programs necessary for the operation of the controller 180. In addition, the memory 160 may temporarily store various data such as a phonebook, messages, still images, or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage, which performs the functions of the memory 160 on the internet.

The interface unit 170 may interface with an external device that can be connected to the mobile terminal 100. The interface unit 170 may be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

When the mobile terminal 100 is connected to an external cradle, the interface unit 170 may provide a path for supplying power from the external cradle to the mobile terminal 100 or for transmitting various signals from the external cradle to the mobile terminal 100.

The controller 180 may control the general operation of the mobile terminal 100. For example, the controller 180 may perform various control operations regarding making/receiving a voice call, transmitting/receiving data, or making/receiving a video call. The controller 180 may include a multimedia playback module 181, which plays multimedia data. The multimedia playback module 181 may be implemented as a hardware device and may be installed in the controller 180. Alternatively, the multimedia playback module 181 may be implemented as a software program.

The power supply unit 190 may be supplied with power by an external power source or an internal power source and may supply power to the other components in the mobile terminal 100.

The mobile terminal 100 may include a wired/wireless communication system or a satellite communication system and may thus be able to operate in a communication system capable of transmitting data in units of frames or packets.

The exterior of the mobile terminal 100 will hereinafter be described in detail with reference to FIGS. 2 and 3. For convenience, assume that the mobile terminal 100 is a bar-type mobile terminal equipped with a touch screen. However, the present invention is not restricted to a bar-type mobile terminal. Rather, the present invention can be applied to various mobile phones, other than a bar-type mobile terminal.

Figure 2:
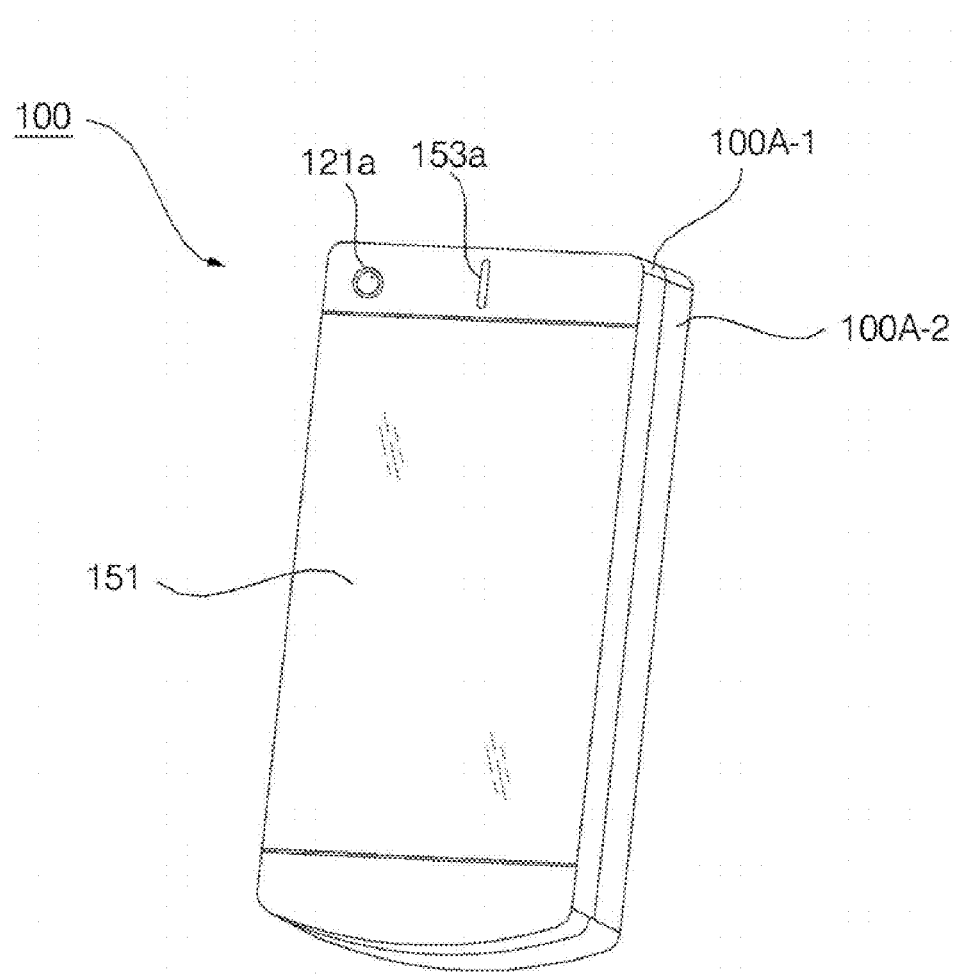
FIG. 2 illustrates a front perspective view of the mobile terminal shown in FIG. 1.

FIG. 2 illustrates a front perspective view of the mobile terminal 100 shown in FIG. 1. Referring to FIG. 2, the exterior of the mobile terminal 100 may be defined by a front case 100A-1 and a rear case 100A-2. Various electronic devices may be installed in the space formed by the front case 100A-1 and the rear case 100A-2.

The display module 151, a first audio output module 153a, and a first camera 121a may be disposed in the front case 100A-1.

Since a touch pad is configured to overlap the display module 151 and thus to form a layer structure, the display module 151 may serve as a touch screen. Thus, it is possible for the user to enter various information to the mobile terminal 100 simply by touching the display module 151.

The user input unit (not shown) may adopt various manipulation methods as long as it can offer tactile feedback to the user.

The user input unit may allow the user to enter various commands such as 'start', 'end', and 'scroll,' and various numerals, characters or symbols to the mobile terminal 100. The user input unit 130 may also provide a number of hot keys for activating certain functions of the mobile terminal 100.

Figure 3:
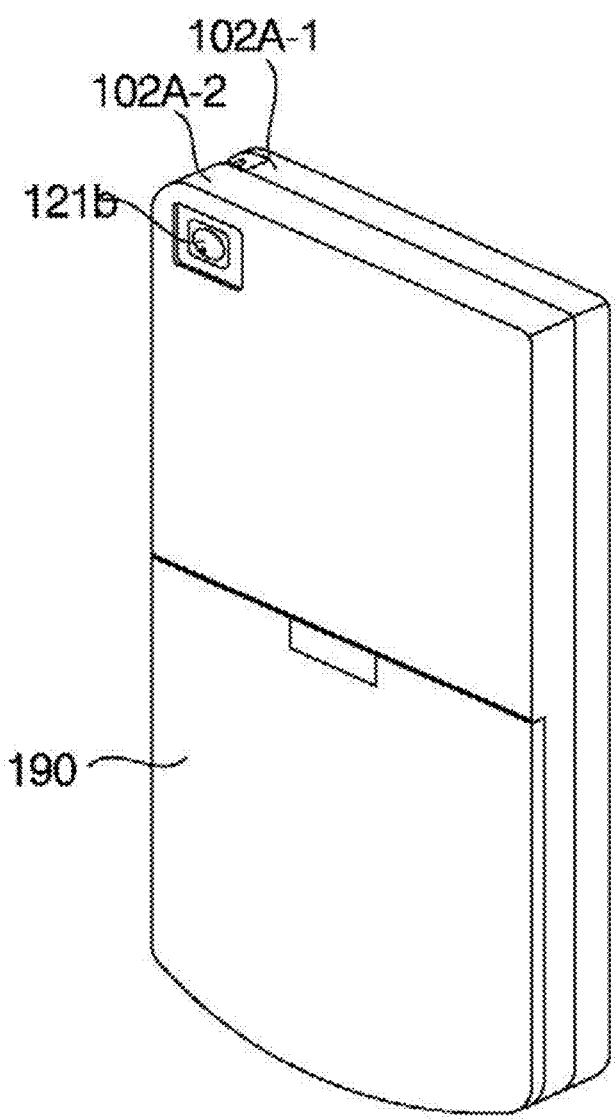
FIG. 3 illustrates a rear perspective view of the mobile terminal shown in FIG. 2.

FIG. 3 illustrates a rear perspective view of the mobile terminal 100 shown in FIG. 2. Referring to FIG. 3, a second camera 121b may be provided at the rear of the rear case 100A-2, and another user input unit (not shown) may be disposed in the rear case 100A-2.

The second camera 121b may have a different photographing direction from that of the first camera 121a shown in FIG. 2. In addition, the first and second cameras 121a and 121b may have different resolutions. For example, the first camera 121a may be used to capture and then transmit an image of the face of the user during a video call. Thus, a low-resolution camera may be used as the first camera 121a. The second camera 121b may be used to capture an image of an ordinary subject. In this case, the image captured by the second camera 121b may not need to be transmitted. Thus, a high-resolution camera may be used as the second camera 121b.

A cameral flash (not shown) and a mirror (not shown) may be disposed near the second camera 121b. The cameral flash may be used to illuminate a subject when the user attempts to capture an image of the subject with the second camera 121b. The mirror may be used for the user to prepare him- or herself for taking a self shot.

A second audio output module (not shown) may be additionally provided in the second rear case 100B-2. The second audio output module may realize a stereo function along with the first audio output module 153a. The second audio output module may also be used in a speaker-phone mode.

An antenna (not shown) for receiving a broadcast signal may be disposed on one side of the rear case 100A-2. The antenna may be installed so as to be able to be pulled out of the rear case 100A-2.

The power supply unit 190 may be disposed in the rear case 100A-2. The power supply unit 190 may be a rechargeable battery and may be coupled to the rear case 100A-2 so as to be attachable to or detachable from the rear case 100A-2.

The second camera 121b and the other elements that have been described as being disposed in the rear case 100A-2 may be disposed in the front case 100A-1. In addition, the first camera 121a may be configured to be rotatable and thus to cover the photographing direction of the second camera 121b. In this case, the second camera 121b may be optional.

Figure 4:
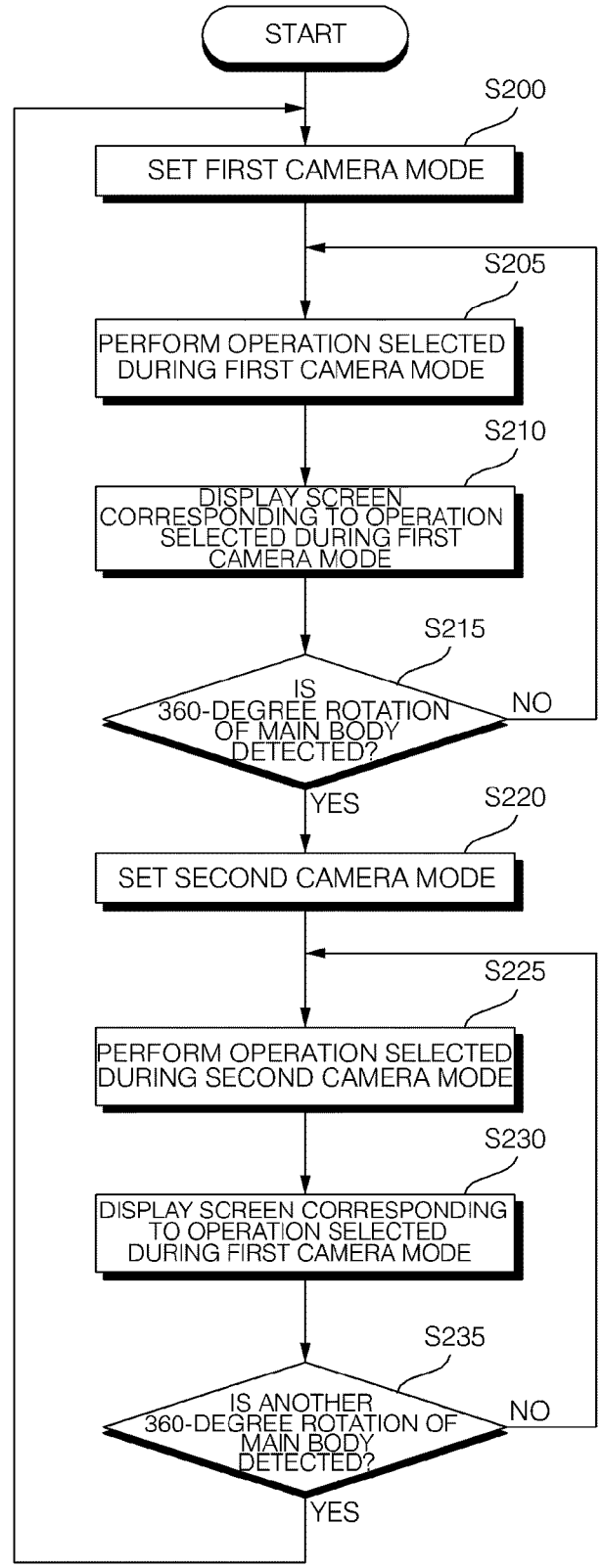
FIG. 4 illustrates a flowchart of a method of controlling the operation of a mobile terminal according to a first exemplary embodiment of the present invention.

FIG. 4 illustrates a flowchart of a method of controlling the operation of a mobile terminal according to a first exemplary embodiment of the present invention. Referring to FIG. 4, the controller 180 may switch a camera 121 to a first camera mode (S200), and may control an operation selected during the first camera mode in response to a user command to be performed (S205). Thereafter, the controller 180 may display a screen corresponding to the operation selected during the first camera mode on the display module 151 (S210). The screen displayed in operation S210 may be a preview screen, a screen showing how the operation selected during the first camera mode is being performed, a screen showing the results of the operation selected during the first camera mode, and a menu screen for selecting one of a number of functions provided in connection with the first camera mode.

Operations S200 through S210 may be repeatedly performed until a 360-degree rotation of the main body of the mobile terminal 100 about a predetermined axial direction is detected.

Thereafter, if sensing data provided by the motion sensor 145 indicates that the main body of the mobile terminal 100, which includes the front case 100A-1 and the rear case 100A-2, has been rotated about the predetermined axial direction by 360 degrees (S215), the controller 180 may switch the mobile terminal 100 from the first camera mode to a second camera mode (S220), and may control an operation selected during the second camera mode in response to a user command to be performed (S225). Thereafter, the controller 180 may display a screen corresponding to the operation selected during the second camera mode on the display module 151 (S230). The screen displayed in operation S230 may be a preview screen, a screen showing how the operation selected during the second camera mode is being performed, a screen showing the results of the operation selected during the second camera mode, and a menu screen for selecting one of a number of functions provided in connection with the second camera mode.

The second camera mode may be an operating mode set in advance, in response to a user command, to be entered upon a 360-degree rotation of the main body of the mobile terminal 100 about the predetermined axial direction or may be an operating mode associated with the first camera mode. For example, the first camera mode may be a photo capture mode, and the second camera mode may be a video capture mode. Alternatively, the first camera mode may be a normal mode, and the second camera mode may be a macro mode.

Operations S225 through S235 may be repeatedly performed until another 360-degree rotation of the main body of the mobile terminal 100 about the predetermined axial direction is detected. If another 360-degree rotation of the main body of the mobile terminal 100 about the predetermined axial direction is detected during the second camera mode (S235), the method returns to operation S200.

In this manner, it is possible to easily switch the mobile terminal 100 between the first and second camera modes simply by rotating the mobile terminal 100 about the predetermined axial direction.

Figure 5:
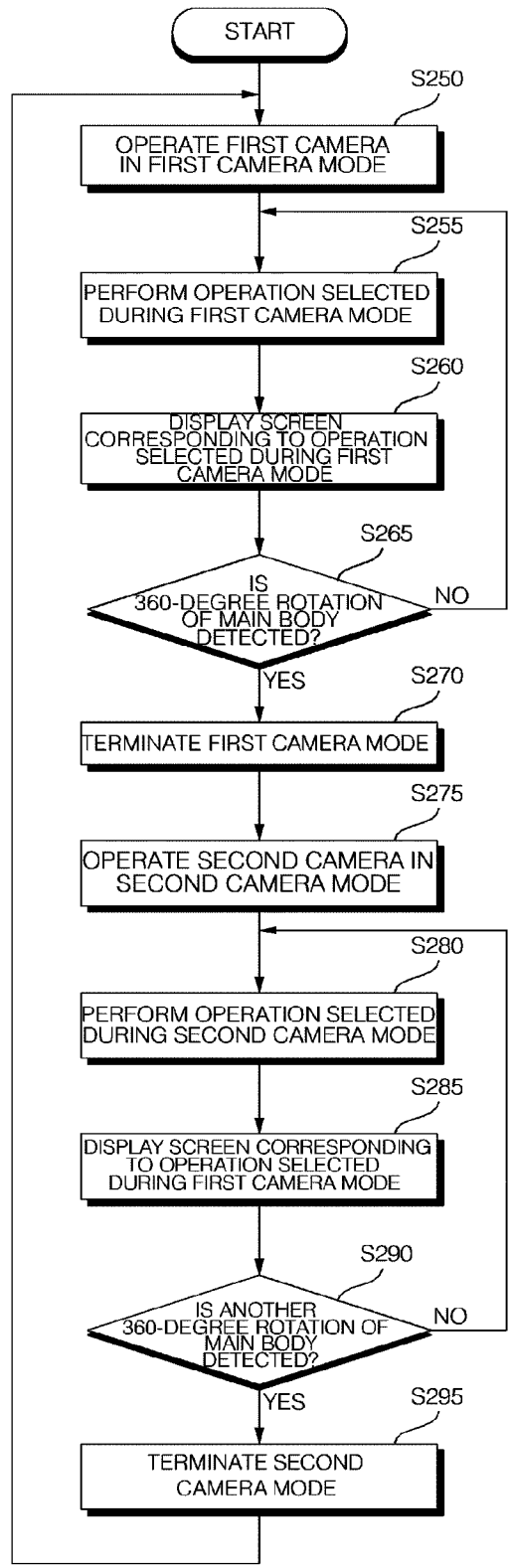
FIG. 5 illustrates a flowchart of a method of controlling the operation of a mobile terminal according to a second exemplary embodiment of the present invention.

FIG. 5 illustrates a flowchart of a method of controlling the operation of a mobile terminal according to a second exemplary embodiment of the present invention. In the second exemplary embodiment, the controller 180 may switch the mobile terminal 100 from one camera mode to another camera mode upon a 360-degree rotation of the main body of the mobile terminal 100 about a predetermined axial direction, and may selectively operate the first and second cameras 121a and 121b in different camera modes.

More specifically, referring to FIG. 5, the controller 180 may operate the first camera 121a in a first camera mode (S250). Thereafter, the controller 180 may control an operation selected during the first camera mode to be performed using the first camera 121a (S255). Thereafter, the controller 180 may display a screen corresponding to the operation selected during the first camera mode on the display module 151 (S260). Operations S255 and S260 are almost the same as operations S205 and S210, respectively, of FIG. 4.

Thereafter, if a 360-degree rotation of the main body of the mobile terminal 100 about the predetermined axial direction is detected (S265), the controller 180 may terminate the first camera mode (S270), may operate the second camera 121b in a second camera mode and may switch the mobile terminal 100 to the second camera mode (S275). Thereafter, the controller 180 may control an operation selected during the second camera mode to be performed using the second camera 121b (S280). Thereafter, the controller 180 may display a screen corresponding to the operation selected during the second camera mode on the display module 151 (S285). That is, the controller 180 may switch the mobile terminal 100 from the first camera mode to the second camera mode upon a 360-degree rotation of the main body of the mobile terminal 100 about the predetermined axial direction. The second camera mode may be an operating mode set in advance in response to a user command to be entered upon a 360-degree rotation of the main body of the mobile terminal 100 about the predetermined axial direction or an operating mode associated with the first camera mode. For example, the first camera mode may be a video call mode using the first camera 121a, and the second camera mode may be a photo capture mode using the second camera 121b.

If another 360-degree rotation of the main body of the mobile terminal 100 about the predetermined axial direction is detected during the second camera mode (S290), the controller 180 may terminate the second camera mode (S295), and the method returns to operation S250.

Figure 6:
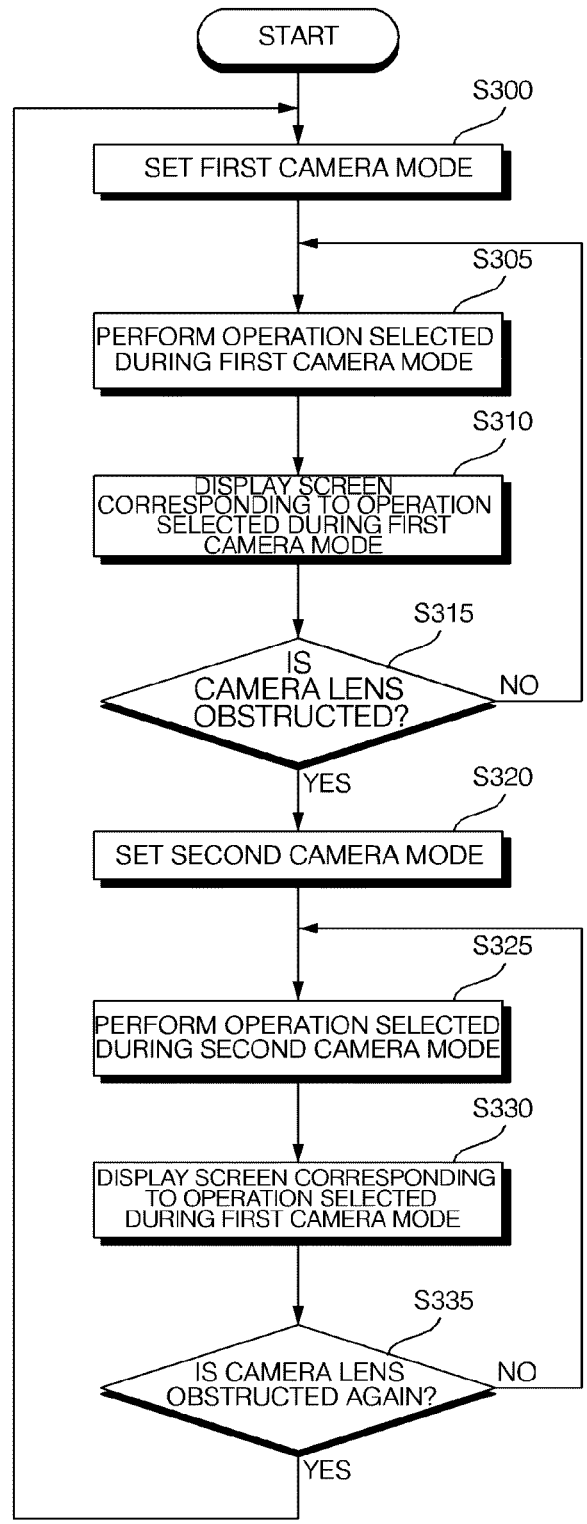
FIG. 6 illustrates a flowchart of a method of controlling the operation of a mobile terminal according to a third exemplary embodiment of the present invention.

FIG. 6 illustrates a flowchart of a method of controlling the operation of a mobile terminal according to a third exemplary embodiment of the present invention. Referring to FIG. 6, operations S300 through S310 and S320 through S330 are the same as operations S200 through S210 and S220 through S230, respectively, of FIG. 4. That is, the third exemplary embodiment is the same as the first exemplary embodiment except that the controller 180 may switch the mobile terminal 100 from a first camera mode to a second camera mode or vice versa according to whether the lens of the first or second camera 121a or 121b is obstructed.

More specifically, referring to FIG. 6, the controller 180 may determine whether the lens of the first or second camera 121a or 121b is obstructed (S315 or S335) by measuring the amount of light incident on the corresponding lens with the aid of a photosensitive sensor and comparing the result of the measurement with a reference level. Then, if it is determined that the lens of the first or second camera 121a or 121b is being used is obstructed, the controller 180 may switch the mobile terminal 100 from a first camera mode to a second camera mode or vice versa.

Figure 7:
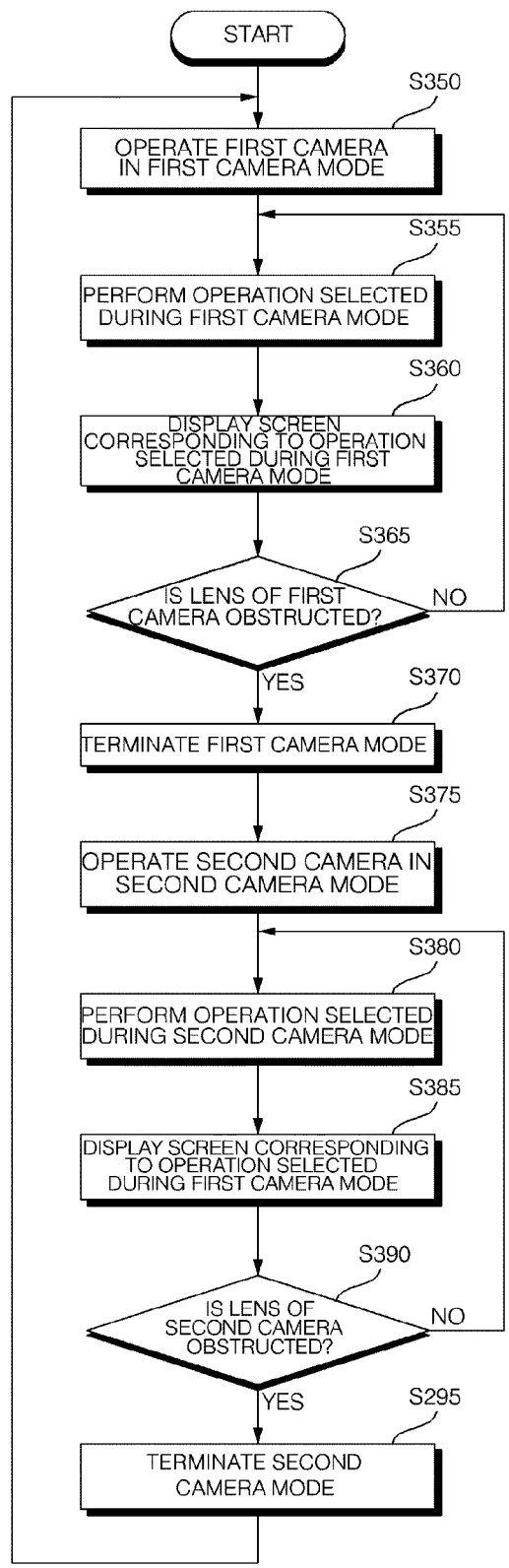
FIG. 7 illustrates a flowchart of a method of controlling the operation of a mobile terminal according to a fourth exemplary embodiment of the present invention.

FIG. 7 illustrates a flowchart of a method of controlling the operation of a mobile terminal according to a fourth exemplary embodiment of the present invention. Referring to FIG. 7, operations S350 through S360 and S370 through S385 are the same as operations S250 through S260 and S270 through S285, respectively, of FIG. 5. That is, the fourth exemplary embodiment is the same as the second exemplary embodiment except that the controller 180 may switch the mobile terminal 100 from a first camera mode to a second camera mode or vice versa whenever the lens of the first or second camera 121a or 121b is obstructed.

More specifically, referring to FIG. 7, the controller 180 may determine whether the lens of the first or second camera 121a or 121b is obstructed (S365 or S390) by measuring the amount of light incident on the corresponding lens with the aid of a photosensitive sensor and comparing the result of the measurement with a reference level. Then, if it is determined that the lens of the first or second camera 121a or 121b is obstructed, the controller 180 may switch the mobile terminal 100 from the first camera mode to the second camera mode or vice versa.

FIGS. 8 through 14 illustrate diagrams for explaining the first through fourth exemplary embodiments.

Figure 8:
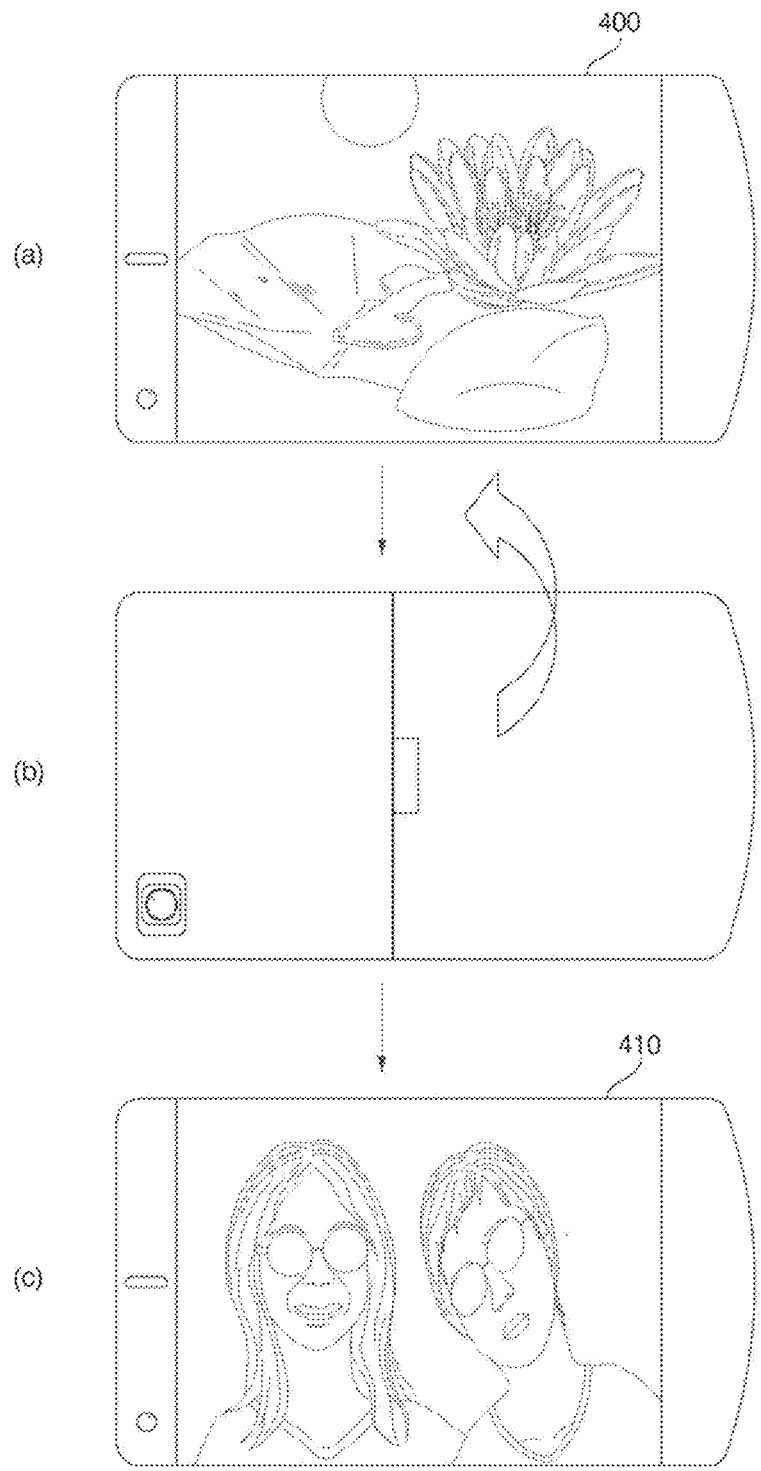
FIGS. 8 through 10 illustrate diagrams for explaining how to switch to a camera mode in accordance with the movement of the main body of a mobile terminal.
Figure 9:
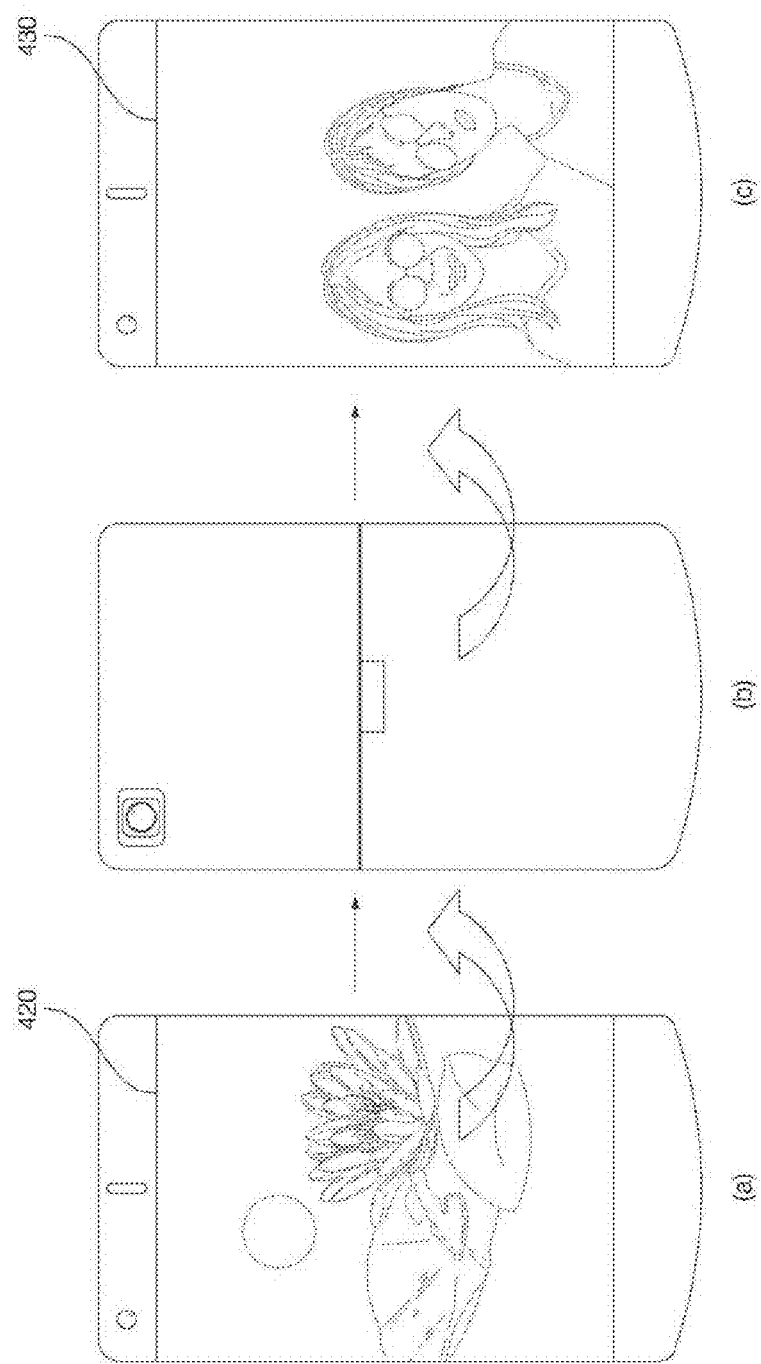
Figure 10:
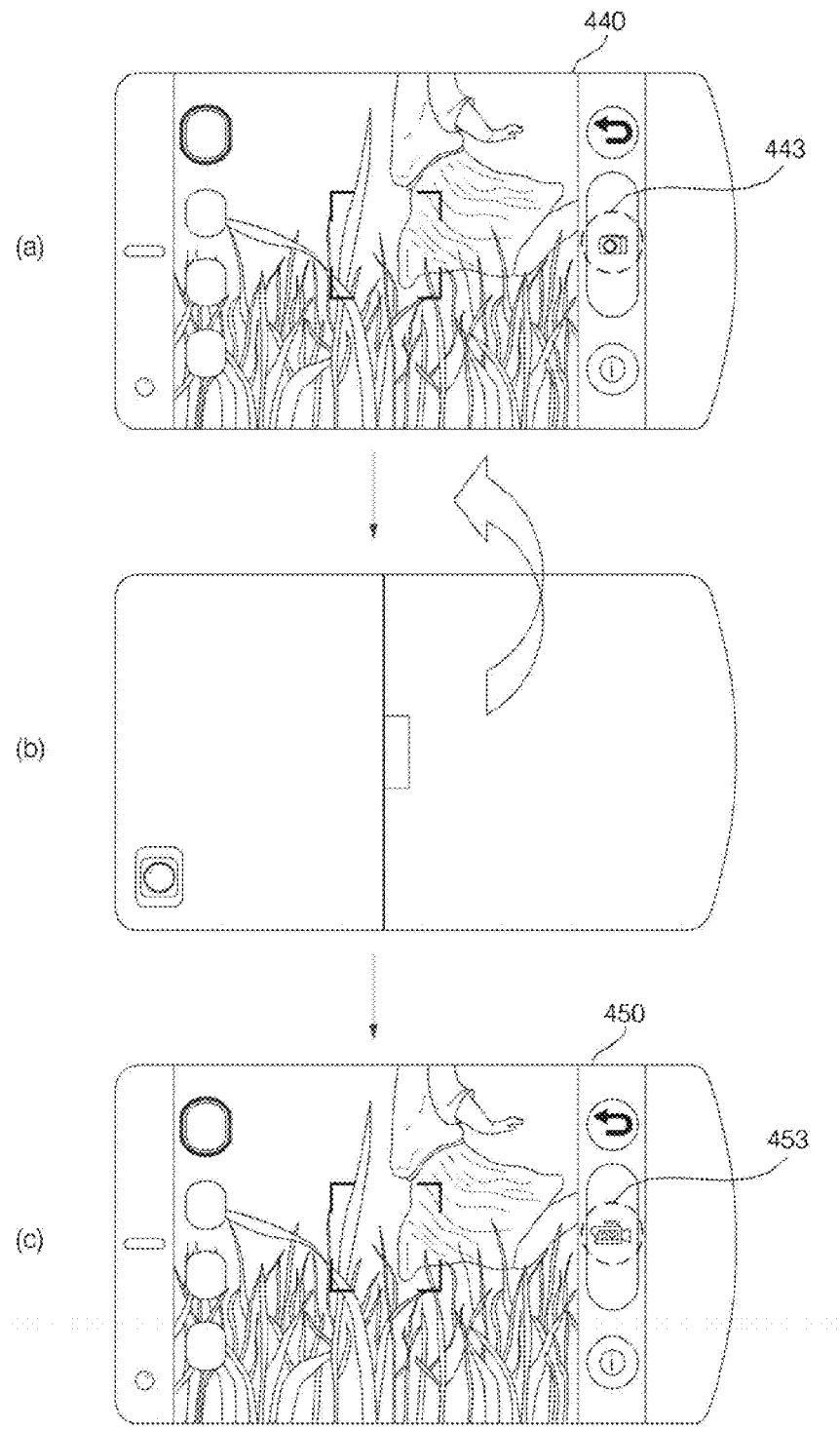
Figure 11:
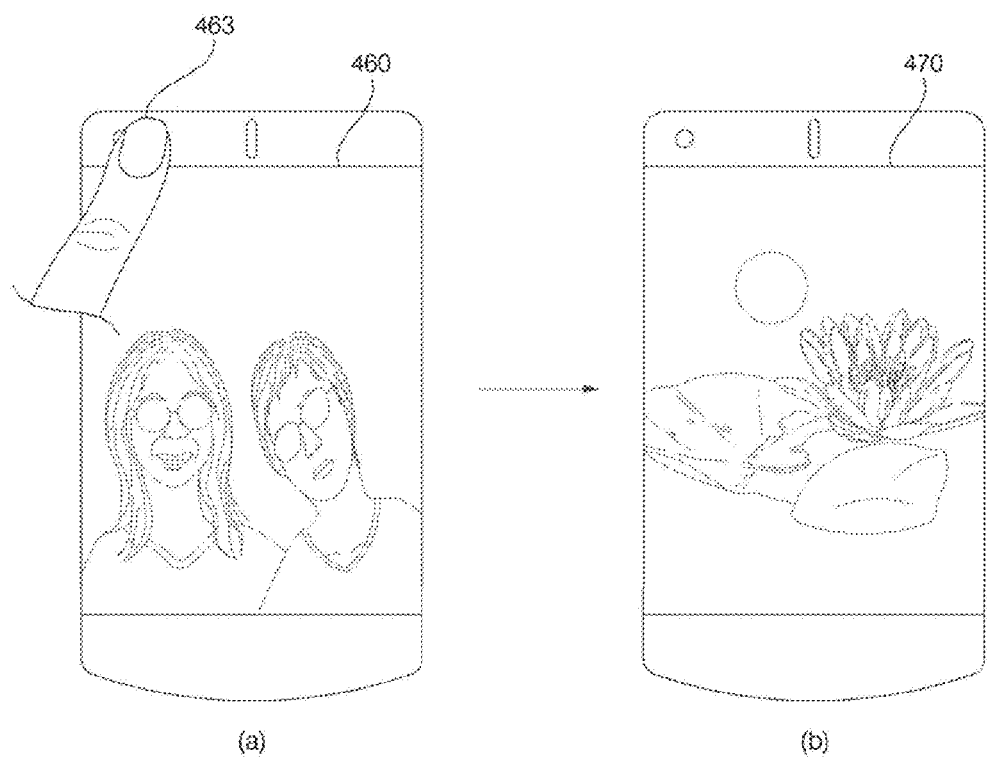
FIGS. 11 through 14 illustrate diagrams for explaining how to switch to a camera mode according to whether a camera lens is closed.
Figure 12:
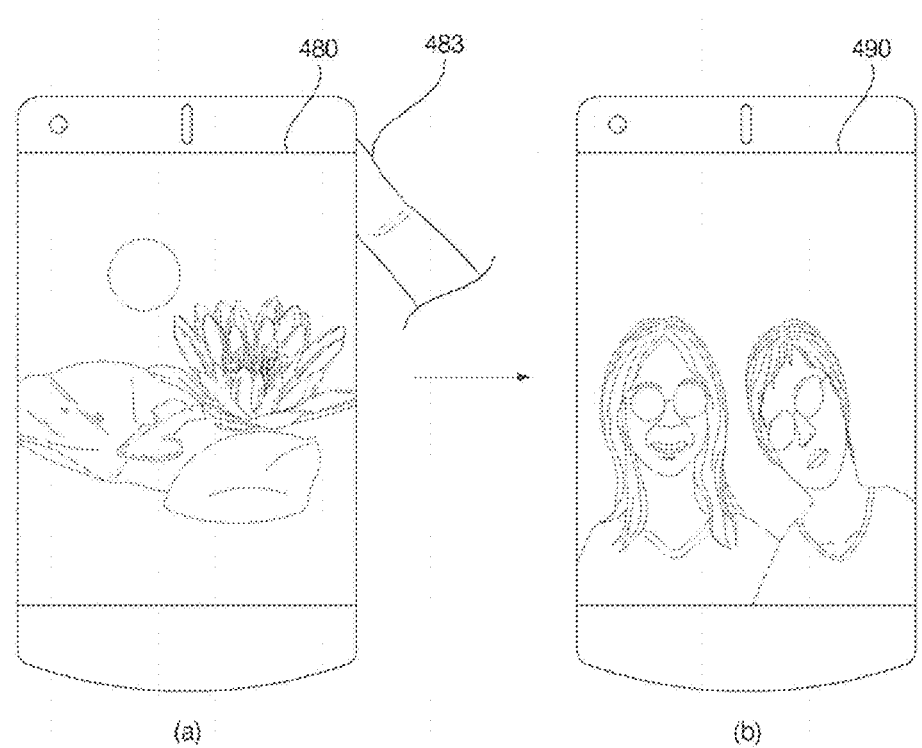
Figure 13:
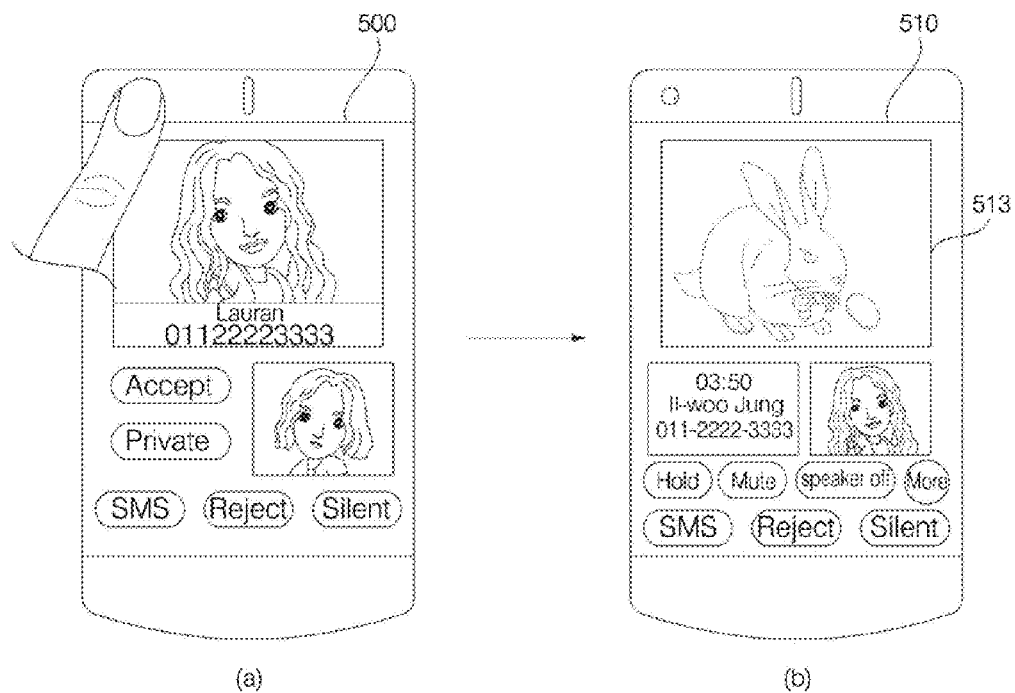
Figure 14:
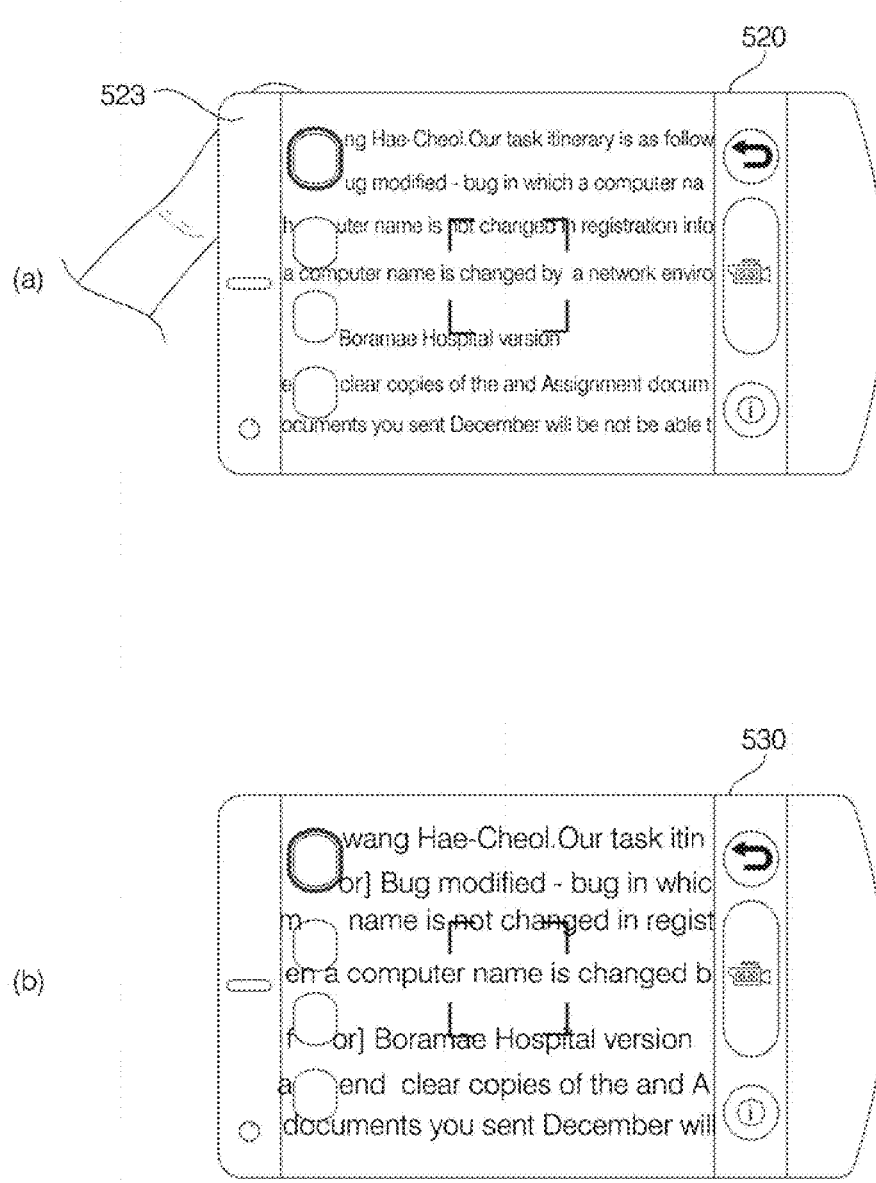

More specifically, FIGS. 8 through 10 illustrate how to switch the mobile terminal 100 from one camera mode to another camera mode in accordance with the movement of the main body of the mobile terminal 100, as performed in the first and third exemplary embodiments.

Referring to FIGS. 8(a) through 8(c), if the main body of the mobile terminal 100 is rotated about a predetermined axial direction by 360 degrees, i.e., is rolled over, when the mobile terminal 100 is placed in a photo capture mode using the second camera 121b and a preview screen 400 is displayed on the display module 151, the mobile terminal 100 may be switched to a video call mode using the first camera 121a, and a video call screen 410 may be displayed on the display module 151.

Referring to FIG. 9, if the mobile terminal 100 is rolled over once while being held vertically, the mobile terminal 100 may be switched from the photo capture mode using the second camera 121a to the video call mode using the first camera 121a.

In this manner, it is possible to easily switch the mobile terminal from the photo capture mode using the second camera 121a to the video call mode using the first camera 121a or vice versa by rolling over the mobile terminal 100.

Referring to FIGS. 10(a) through 10(c), if, during the photo capture mode using the second camera 121b, the main body of the mobile terminal 100 is rolled over once when a preview screen 440 including a photo capture mode icon 443 is displayed on the display module 151, the mobile terminal 100 may be switched to a video capture mode, and a preview screen 450 including a video capture mode icon 453 may be displayed on the display module 151.

In this manner, it is possible to easily switch the mobile terminal from a photo capture mode to a video capture mode or vice versa by rolling over the mobile terminal 100.

FIGS. 11 through 14 illustrate how to switch the mobile terminal 100 from one camera mode to another camera mode according to whether the lens of the first or second camera 121a or 121b is obstructed, as performed in the second and fourth exemplary embodiments.

Referring to FIGS. 11(a) and 11(b), if, during a video call mode using the first camera 121a, the first camera 121a is obstructed with a finger, as indicated by reference numeral 463, when a video call screen 460 is displayed on the display module 151, the mobile terminal 100 may be switched to an image capture mode using the second camera 121b, and a preview screen 470 may be displayed on the display module 151.

Referring to FIGS. 12(a) and 12(b), if, during the image capture mode using the second camera 121b, the second camera 121b is obstructed with a finger, as indicated by reference numeral 483, when a preview screen 480 is displayed on the display module 151, the mobile terminal 100 may be switched to the video call mode using the first camera 121a, and a video call screen 490 may be displayed on the display module 151.

In this manner, it is possible to easily switch the mobile terminal 100 from the image capture mode using the second camera 121b to the video call mode using the first camera 121a or vice versa by obstructing the first or second camera 121a and 121b.

Referring to FIGS. 13(a) and 13(b), if, during the video call mode using the first camera 121a, the first camera 121a is obstructed with a finger when a video call screen 500 is displayed on the display module 151, the mobile terminal 100 may be switched to a privacy protection video call mode, and a replacement image 513, instead of an image of the user, may be sent to the caller or caller's mobile terminal.

Referring to FIGS. 14(a) and 14(b), if, during a camera mode using the second camera 121b, the second camera 121b is obstructed with a finger when a preview screen 520 is displayed on the display module 151, the mobile terminal 100 may be switched to a macro mode, and a zoom-in screen 530 may be displayed on the display module 151. That is, it is possible to switch the mobile terminal 100 to the macro mode simply by obstructing the second camera 121b with a finger. The switching of the mobile terminal 100 to the macro mode can be applied to text recognition or a barcode reader.

In this manner, it is possible to switch the mobile terminal 100 from one camera mode to another camera mode simply by obstructing the lens of the first or second camera 121a or 121b of the mobile terminal 100. Thus, it is possible to easily control the operation of the first or second camera 121a or 121b of the mobile terminal 100.

The mobile terminal according to the present invention and the method of controlling the operation of a mobile terminal according to the present invention are not restricted to the exemplary embodiments set forth herein. Therefore, variations and combinations of the exemplary embodiments set forth herein may fall within the scope of the present invention.

The present invention can be realized as code that can be read by a processor (such as a mobile station modem (MSM)) included in a mobile terminal and that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

As described above, according to the present invention, it is possible to switch a mobile terminal from one camera mode to another camera mode upon a 360-degree rotation of the main body of the mobile terminal about a predetermined axial direction. In addition, it is possible to switch the mobile terminal from one camera mode to another camera mode according to whether the lens of a camera of the mobile terminal is obstructed. Therefore, it is possible to maximize user convenience regarding the use of a camera of the mobile terminal.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling an operation of a bar-type mobile terminal, the method comprising:
controlling operation of a camera positioned in a bar-type main body of the bar-type mobile terminal in a photo capture mode via a controller of the bar-type mobile terminal;
controlling a display of the bar-type mobile terminal, via the controller, to display a first screen corresponding to an operation selected during the photo capture mode while the camera is operated in the photo capture mode, the first screen comprising a first icon for indicating that the camera is operating in the photo capture mode;
determining, via the controller, that the bar-type main body has been rotated 360 degrees in a predetermined direction about an axis of the bar-type main body while the camera was operating in the photo capture mode;
ceasing controlling operation of the camera, via the controller, in the photo capture mode based upon the determination that the bar-type main body has been rotated 360 degrees in the predetermined direction while the camera was operating in the photo capture mode;
controlling operation of the camera, via the controller, in a video capture mode based upon the determination that the bar-type main body has been rotated 360 degrees in the predetermined direction while the camera was operating in the photo capture mode;
controlling the display via the controller, while the camera is operated in the video capture mode, to display a second screen corresponding to an operation selected during the video capture mode, the second screen comprising a second icon for indicating that the camera is operating in the video capture mode;
determining, via the controller, that the bar-type main body has been rotated 360 degrees in the predetermined direction about the axis of the bar-type main body while the camera was operating in the video capture mode;
ceasing controlling operation of the camera, via the controller, in the video capture mode based upon the determination that the bar-type main body has been rotated 360 degrees in the predetermined direction while the camera was operating in the video capture mode; and
controlling operation of the camera, via the controller, in the photo capture mode based upon the determination that the bar-type main body has been rotated 360 degrees in the predetermined direction while the camera was operating in the video capture mode.

2. The method of claim 1, further comprising sensing a movement of the bar-type main body via a motion sensor of the bar-type mobile terminal.

3. A bar-type mobile terminal, comprising:
a bar-type main body;
a camera positioned in the bar-type main body;
a motion sensor configured to sense a movement of the bar-type main body;
a display positioned in the bar-type main body and configured to display a screen associated with an operation of the camera; and a controller configured to:
control operation of the camera in a photo capture mode;
control the display to display a first screen corresponding to an operation selected during the photo capture mode, the first screen comprising a first icon for indicating that the camera is operating in the photo capture mode;
determine that the bar-type main body has been rotated 360 degrees in a predetermined direction about an axis of the bar-type main body based on sensing data provided by the motion sensor while the camera was operating in the photo capture mode;
cease controlling operation of the camera in the photo capture mode based upon the determination that the bar-type main body has been rotated 360 degrees in the predetermined direction while the camera was operating in the photo capture mode;
control operation of the camera in a video capture mode based upon the determination that the bar-type main body has been rotated 360 degrees in the predetermined direction while the camera was operating in the photo capture mode;
control the display to display, while the camera is operated in the video capture mode, a second screen corresponding to an operation selected during the video capture mode, the second screen comprising a second icon for indicating that the camera is operating in the video capture mode;
determine that the bar-type main body has been rotated 360 degrees in the predetermined direction about the axis of the bar-type main body while the camera was operating in the video capture mode based on sensing data provided by the motion sensor;
cease controlling operation of the camera in the video capture mode based upon the determination that the bar-type main body has been rotated 360 degrees in the predetermined direction while the camera was operating in the video capture mode; and
control operation of the camera in the photo capture mode based upon the determination that the bar-type main body has been rotated 360 degrees in the predetermined direction while the camera was operating in the video capture mode.

4. A method of controlling an operation of a bar-type mobile terminal, the method comprising:
controlling operation of a first camera positioned in a front case of a bar-type main body of the bar-type mobile terminal in a video call mode via a controller of the bar-type mobile terminal;
controlling a display of the bar-type mobile terminal, via the controller, to display a first screen corresponding to an operation selected during the video call mode while the first camera is operated in the video call mode;
determining, via the controller, that the bar-type main body has been rotated 360 degrees in a predetermined direction about an axis of the bar-type main body while the camera was operating in the video call mode;
controlling the first camera, via the controller, to cease operating in the video call mode based upon the determination that the bar-type main body has been rotated 360 degrees in the predetermined direction while the camera was operating in the video call mode;
controlling operation of a second camera positioned in a rear case of the bar-type main body in a photo capture mode via the controller based upon the determination that the bar-type main body has been rotated 360 degrees in the predetermined direction while the camera was operating in the video call mode;
controlling the display via the controller, while the second camera is operated in the photo capture mode, to display a second screen corresponding to an operation selected during the photo capture mode, the second screen comprising a second icon for indicating that the second camera is operating in the photo capture mode;
determining, via the controller, that the bar-type main body has been rotated 360 degrees in the predetermined direction about the axis of the bar-type main body while the second camera was operating in the photo capture mode;
controlling the second camera, via the controller, to cease operating in the photo capture mode based upon the determination that the bar-type main body has been rotated 360 degrees in the predetermined direction while the second camera was operating in the photo capture mode; and
controlling operation of the first camera, via the controller, in the video call mode based upon the determination that the bar-type main body has been rotated 360 degrees in the predetermined direction while the second camera was operating in the photo capture mode.

5. A bar-type mobile terminal, comprising:
a bar-type main body comprising a front case and a rear case;
a first camera positioned in the front case of the main body;
a second camera positioned in the rear case of the main body;
a motion sensor configured to sense a movement of the bar-type main body;
a display positioned in the bar-type main body and configured to display a screen associated with an operation of the first camera or a screen associated with an operation of the second camera; and
a controller configured to:
control operation of the first camera in a video call mode;
control the display to display a first screen corresponding to an operation selected during the video call mode;
determine that the bar-type main body has been rotated 360 degrees in a predetermined direction about an axis of the bar-type main body while the camera was operating in the video call mode based on sensing data provided by the motion sensor;
control the first camera to cease operating in the video call mode based upon the determination that the bar-type main body has been rotated 360 degrees in the predetermined direction while the camera was operating in the video call mode;
control operation of the second camera in a photo capture mode based upon the determination that the bar-type main body has been rotated 360 degrees in the predetermined direction while the camera was operating in the video call mode;
control the display to display, while the second camera is operated in the photo capture mode, a second screen corresponding to an operation selected during the photo capture mode, the second screen comprising a second icon for indicating that the second camera is operating in the photo capture mode;
determine that the bar-type main body has been rotated 360 degrees in the predetermined direction about the axis of the bar-type main body while the second camera was operating in the photo capture mode;
control the second camera to cease operating in the photo capture mode based upon the determination that the bar-type main body has been rotated 360 degrees in the predetermined direction while the second camera was operating in the photo capture mode; and control operation of the first camera in the video call mode based upon the determination that the bar-type main body has been rotated 360 degrees in the predetermined direction while the second camera was operating in the photo capture mode.

* * * * *